H. CHRISMAN.
FLUID METER.
APPLICATION FILED NOV. 27, 1916.
1,286,942.
Patented Dec. 10, 1918.
2 SHEETS—SHEET 1.
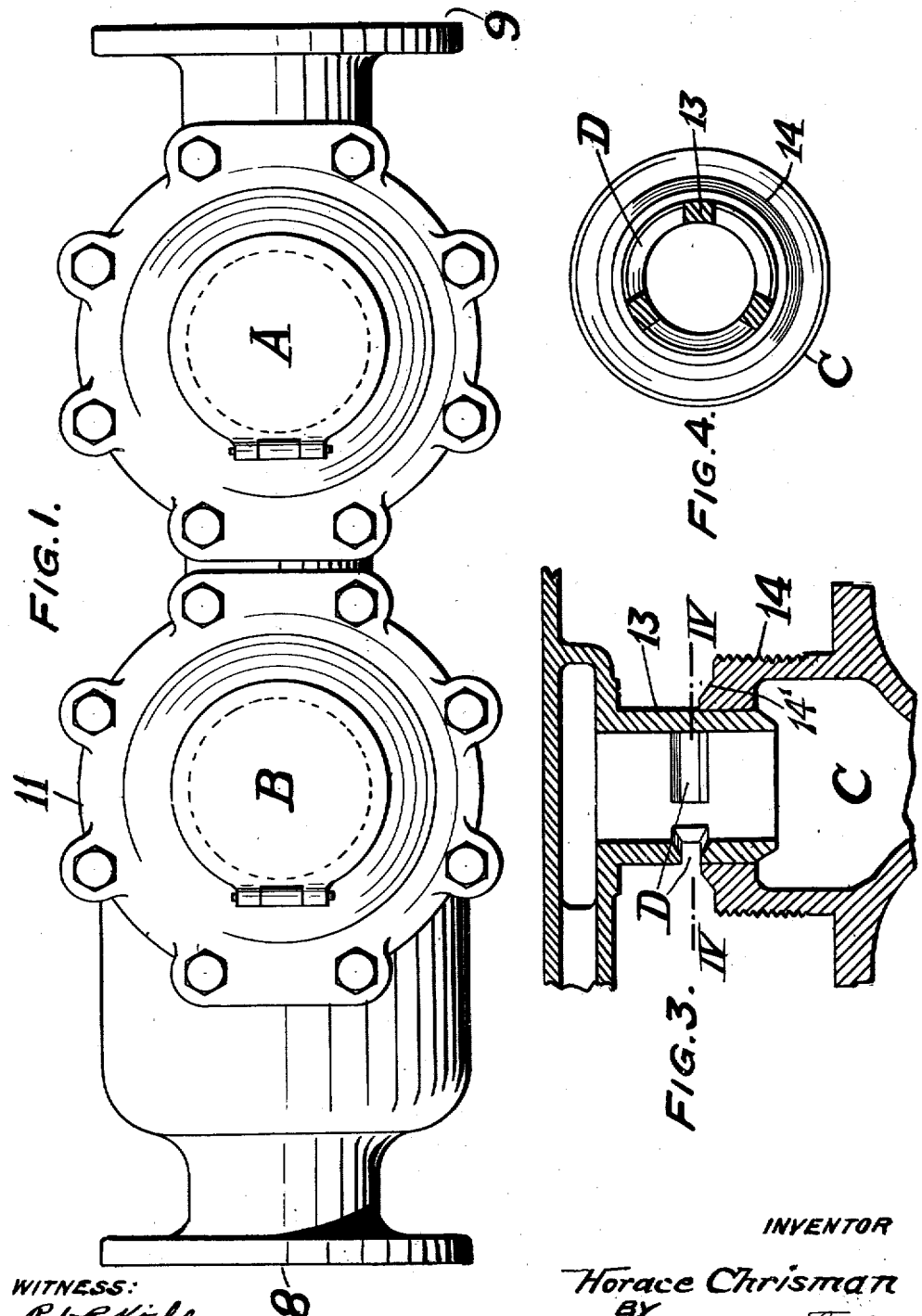
INVENTOR
Horace Chrisman
BY
ATTORNEYS.

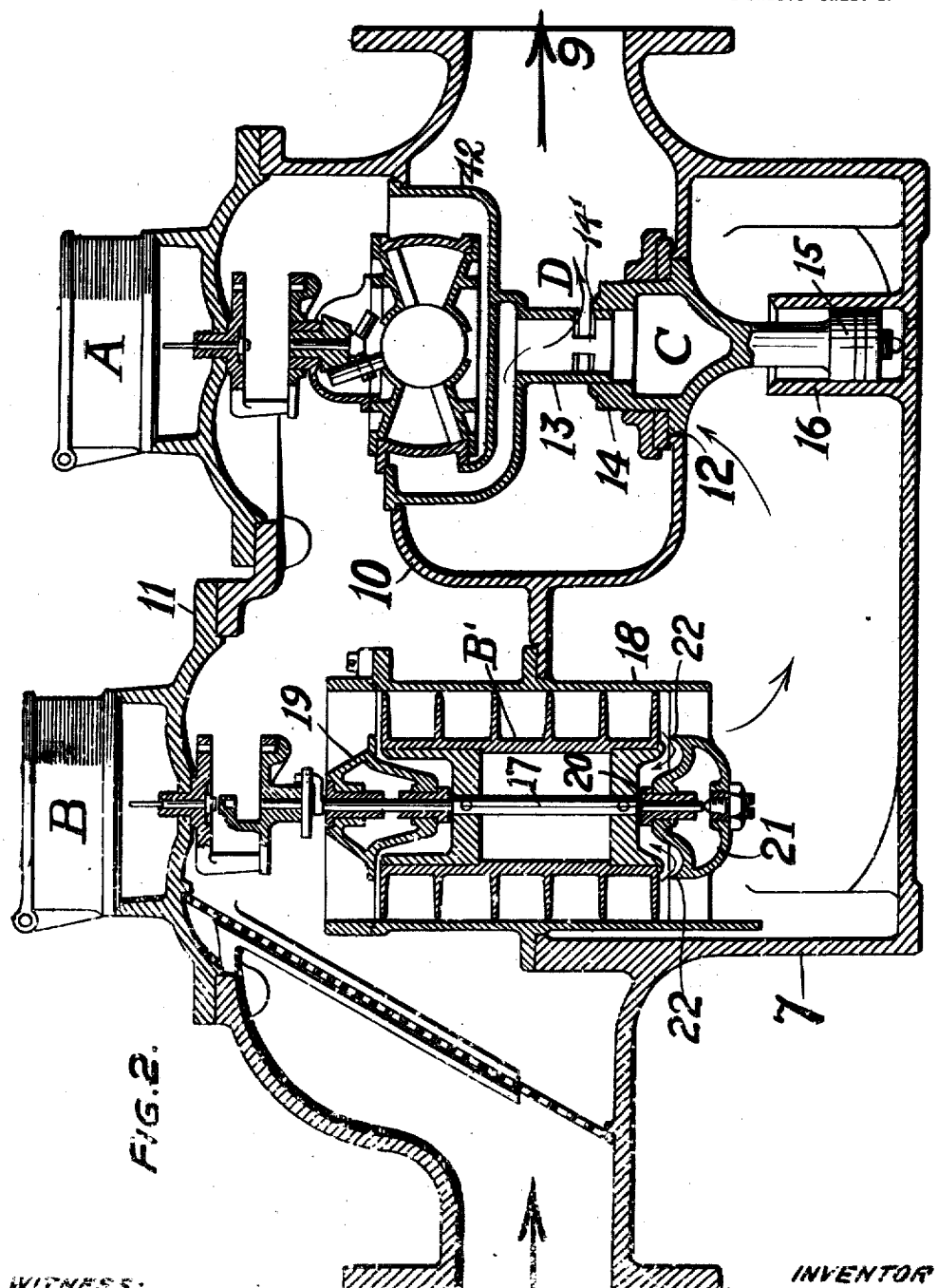

UNITED STATES PATENT OFFICE.

HORACE CHRISMAN, OF EDGEWOOD PARK, PENNSYLVANIA, ASSIGNOR TO PITTSBURGH METER COMPANY, OF EAST PITTSBURGH, PENNSYLVANIA, A CORPORATION OF PENNSYLVANIA.

FLUID-METER.

1,286,942.  Specification of Letters Patent.  Patented Dec. 10, 1918.

Application filed November 27, 1916. Serial No. 133,577.

*To all whom it may concern:*

Be it known that I, HORACE CHRISMAN, a citizen of the United States, residing at Edgewood Park, county of Allegheny, State of Pennsylvania, have invented certain new and useful Improvements in Fluid-Meters, of which the following is a specification.

This invention relates to fluid meters, and particularly to that class of water meters known as compound water meters, in which there are two meters arranged to come into operation successively. The first meter registers the lighter flows and the second meter registers the heavier flows, the registration of the two meters when added together representing the total amount of water passed.

It is one of the primary objects of my invention to insure greater accuracy in registration by providing an improved form of meter whereby the point at which one end of the meter, or one meter, ceases to register and the point at which the other end of the meter, or other meter, begins to register, and vice versa, substantially coincides so that the liability of having both meters running at or near the point of cross-over is eliminated, as is also any such interval or gap, before the second meter begins to register, as will cause the meter to register "slowly."

My invention also contemplates the provision of improved means for relieving the thrust on the bearings for the mechanism which operates the meters.

One of the more specific objects of my invention resides in the provision of an improved form of valve mechanism whereby the meters are caused to sensitively respond at the moment of change or cross-over from one meter to the other.

The foregoing, together with such other objects as may hereinafter appear, or are incident to my invention, I attain by means of a construction, the preferred form of which I have illustrated in the accompanying drawings, wherein:

Figure 1 is a plan view of a compound water meter embodying my improvements; Fig. 2 is a longitudinal section through the meter; Fig. 3 is a sectional view through the main valve mechanism on an enlarged scale; and Fig. 4 is a section taken on the line IV—IV of Fig. 3.

Referring now to the drawings, it will be seen that I have illustrated a standard and well known form of compound water meter, the construction and operation of which will need no extended description, it being sufficient to point out briefly that the meter comprises a main casing 7 having an inlet opening 8 and a discharge opening 9, the interior of the casing being arranged to receive the operating mechanism of the meters A and B, the indicating portions of which are carried on the removable cover plate 11. The wall 10 divides the interior of the casing into two compartments, communication between which is had by means of the opening or orifice 12 which is controlled by valve C.

The operating mechanism for meter A is of the wabble disk type, and its main casing 42 terminates in the hollow stem 13 which is provided with port openings D, to be hereinafter more specifically described. The upper portion of the valve C terminates in a sleeve 14 into which the stem 13 projects, the arrangement being such as to provide a guide for the valve C during its opening and closing movements. Projecting from the lower face of the valve C is a piston 15 which fits into the upstanding cylindrical member 16, the space beneath the piston being open to the atmosphere, thereby providing a differential of pressure on the piston head, whereby the valve C is firmly held on its valve seat when the valve is closed. The piston also acts as a guide member for the valve.

The operating mechanism for the meter B comprises a rotary propeller mechanism B' mounted on the shaft 17, which shaft is supported in bearings in the sleeve 18, which in turn is supported in the wall 10.

The operation of the device as thus far described is as follows: When the draft on the system is light and the flow through the main is small, the valve C is held to a firm seat, and the small flows that take place, pass from the induction to the eduction side of the casing directly through meter A, stem 13, and ports D, the flows being registered by the meter. When there is a heavy or abnormal draft on the system, the valve C opens because of the reduction of pressure on the eduction side of the casing, and the flow through the meter A is stopped by sleeve 14 covering the ports D. The flow now takes place from the induction to the eduction side through the propeller mechanism B' and the main orifice 12, such flow being registered by the meter B. The registration of the meters A and B when added together represents the total amount of water passed.

The point at which the meter A ceases to register and the meter B begins to register and vice versa is termed the "cross-over" and heretofore in compound water meters of the general type described, the registration has been inaccurate either because the meters overlap, that is to say, both meters were registering at or near the point of cross-over, or because there was an interval or gap between the time meter A ceased to register and meter B began to register and vice versa. Furthermore, in meters of this class, inaccurate registration results from the fact that the flow at the time of the cross-over is usally too small in volume to operate the propeller B' as a result of which the registration will be "slow," that is to say, more water will pass through the meter than is registered. It is with the foregoing difficulties that my invention is particularly concerned, and I overcome them in the following manner.

By reference to Figs. 3 and 4 it will be noted that the ports D (of which there are preferably three) are tapered, i. e., the upper and lower walls converged toward each other and that the edge 14' of the sleeve 14 is chamfered. Ports of this shape pass the greatest amount of water, and their use in conjunction with the chamfered edge of the sleeve 14 secures a very much quicker action of the main valve. This results from the fact that any slight restriction of the port openings by the movement of the sleeve 14 increases the resistance to such an extent as to immediately stop the flow through the ports almost entirely, or at least to an extent sufficient to immediately cause an unbalancing of the pressure conditions on opposite sides of the main valve, as a result of which the main valve immediately opens. The foregoing produces several advantageous results. In the first place, there is no liability of having both meters registering at or near the point of cross-over which secures greater accuracy in this type of meter, because it is well known that the meters do not register accurately when both are operating together. Both the quick opening of the valve and the substantial stoppage of the flow through the ports the instant the main valve begins to open, contribute to this increased accuracy. In the second place, by this quick opening of the valve C the entire flow of water is shunted over to the vertical propeller B' at a given instant which thus makes available the maximum power for rotating the propeller at the cross-over. As a result of this quick opening of the valve C and the consequent application of the maximum power available to operate the propeller B', the meter B immediately takes up the registration of the flow at the point where the registration of meter A left off. Thus no "lagging," that is the allowing of water to pass without rotating the propeller at a speed which will indicate the proper amount of water, takes place. This also insures greater accuracy.

It will also be noted that on the reverse operation that is to say, at the point of cross-over from a heavy to a small flow, the meter is equally effective. Thus, it will be seen that the flow through meter A and ports D will not be reëstablished until the ports are completely uncovered and the valve C has seated, and the cross-over from one meter to another takes place, therefore, at the instant the valve C is closed.

Another feature of my invention has to do with the provision of improved means for relieving the bearings of the propeller B' from the downward thrust of the water passing therethrough. The shaft 17 is supported in a bearing 19 located at the top of the casing 18, and in a bearing 20 at the bottom of said casing. The bearing 20 is supported in the bearing block or housing 21, preferably formed integrally with the casing 18. This bearing block has an annular lip 22 which is curved upwardly and arranged so as to direct a portion of the water running downwardly through the propeller upwardly against the bottom of the propeller. By this arrangement the propeller mechanism is subjected to opposite pressures which are more or less equalized, as a result of which the bearing 20 is relieved of the greatest part, if not all, of the downward thrust. The lip 22 terminates in a sharp edge as shown to secure maximum efficiency.

I claim:

1. A compound fluid meter comprising in combination a casing having an orifice, a positive meter for registering light flows and provided with a tapered discharge opening on the eduction side of the casing, a main valve controlling said orifice and normally held in closed position, means for closing said discharge opening operating on the opening of the main valve, and a second meter for registering heavy flows operating when the main valve is open.

2. A compound fluid meter comprising in combination a casing having an orifice, a positive meter for registering light flows and provided with a tapered discharge opening on the eduction side of the casing, a main valve controlling said orifice and normally held in closed position, means for closing said discharge opening operating on the opening of the main valve, and a second meter for registering heavy flows having rotary operating means operated by the flow through the casing when the main valve is open.

3. A compound fluid meter comprising in combination a casing having an orifice, a positive meter for registering light flows provided with a discharge stem having a tapered discharge opening therein on the eduction side of the casing, a main valve controlling said orifice and normally closed, a sleeve carried by said valve and slidable over said stem to close said opening when the main valve opens, and a second meter for registering heavy flows operating when the main valve is open.

4. A compound fluid meter comprising in combination a casing having an orifice, a positive meter for registering light flows and provided with a plurality of tapered discharge openings on the eduction side of the casing, a main valve controlling said orifice and normally held in closed position, means for closing said discharge openings operating on the opening of the main valve, and a second meter for registering heavy flows operating when the main valve is open.

5. In a metering device the combination of a meter having a tubular discharge portion provided with a tapered discharge port, and a sleeve valve slidable along said tubular discharge portion and adapted to cover said port.

6. In a metering device comprising in combination a casing having an orifice therein, a main valve controlling said orifice, a meter having a tubular discharge portion provided with a tapered discharge port, and a sleeve carried by said main valve slidable on said portion and adapted to cover said port, said port being uncovered when the main valve is closed.

7. In a metering device the combination of a meter having a tubular discharge portion provided with a tapered discharge port, and a sleeve valve slidable along said tubular discharge portion and adapted to cover said port, the end of said sleeve being chamfered.

8. A compound fluid meter comprising in combination a casing having an orifice, a positive meter for registering light flows provided with a discharge stem having a tapered discharge opening therein on the eduction side of the casing, a main valve controlling said orifice and normally closed, a sleeve carried by said valve and slidable over said stem to close said opening when the main valve opens, and a second meter for registering heavy flows operating when the main valve is open, the end of said sleeve being chamfered.

In testimony whereof I have hereunto signed my name.

HORACE CHRISMAN.